March 8, 1927.

F. H. WINTER 1,620,504

REGULATING APPARATUS

Filed Sept. 15, 1924

Inventor:
Fred H Winter;
by Alexander S Kent
His Attorney.

Patented Mar. 8, 1927.

1,620,504

UNITED STATES PATENT OFFICE.

FRED H. WINTER, OF SCHENECTADY, NEW YORK, ASSIGNOR TO GENERAL ELECTRIC COMPANY, A CORPORATION OF NEW YORK.

REGULATING APPARATUS.

Application filed September 15, 1924. Serial No. 737,718.

My invention relates to arrangements for regulating the voltage of an electric circuit, and has for its object the provision of an improved regulating apparatus which is both simple in its construction and reliable in its operation.

In the past, various types of regulators have been proposed and used for regulating the voltage or another electrical condition of an electric circuit. Many of these regulators involve the use of an automatically adjustable resistor connected in the field circuit of a dynamo electric machine associated with the circuit to be regulated. My invention appertains to this class of regulators and consists in a modified arrangement of elements by which the operation of such regulators is greatly facilitated.

My invention will be better understood from the following description when considered in connection with the accompanying drawing and its scope will be pointed out in the appended claims.

Figure 1:
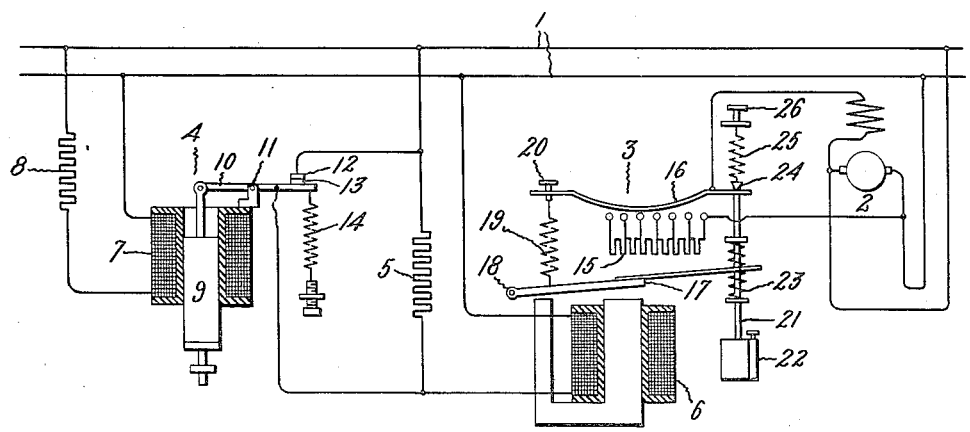
Figure 2:
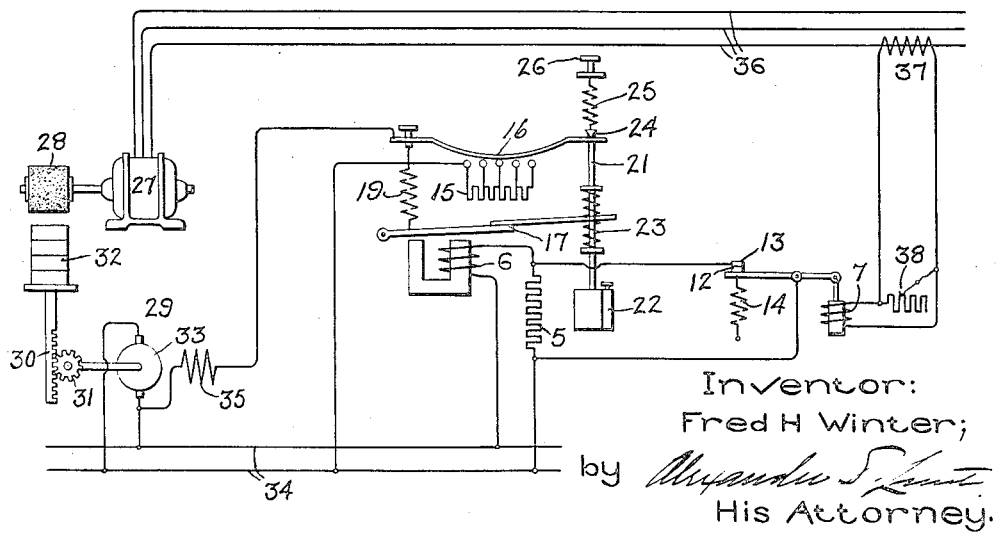

Referring to the drawings, Fig. 1 shows my invention as utilized to regulate the voltage of an electric circuit; and Fig. 2 shows it as utilized for maintaining the load of a pulp grinder motor at a constant value.

Fig. 1 shows an electric circuit 1 adapted to be interconnected with a dynamo electric machine 2, an electro-responsive means illustrated as a relay 3 for regulating the excitation of the machine 2, and vibratory means shown as a control relay 4 for controlling the operation of the regulating relay 3.

The control relay 4 is provided for the purpose of short-circuiting a resistor 5, which is connected in the circuit of the coil 6 of the relay 3, in response to changes in the voltage of the circuit, and comprises a coil 7 which is connected to the circuit 1 through a resistor 8. Operatively associated with the coil 7 is a movable plunger or armature 9 which at its upper end is hinged to a lever 10 arranged to control the connection of the resistor 5 in response to movement of the armature 9 by which opening and closing of the contacts 12 and 13 is effected. A spring 14 is adapted to have its tension adjusted for counterbalancing the plunger 9.

The regulating relay 3 is provided for controlling the excitation of the machine 2 through a field rheostat which comprises a resistance element 15 having a plurality of contacts adapted to cooperate with a contact member 16 and is operated in response to movement of the contacts 12 and 13 by which the resistor 5 is short-circuited. The armature 17 is pivoted at 18 and at a point adjacent its pivoted end is connected to the contact member 16 through a spring 19, the tension of which may be adjusted by a screw 20. At its right hand end the armature 17 is coupled to the plunger rod 21 of a dash pot 22 through an elastic or resilient connection comprising a spring 23. The dash pot rod 21 may be arranged to extend through an opening in the right hand end of the contact member 16 and may be provided at its end with a head or enlargement 24 having a knife edge arranged to make contact with the upper surface of the member 16. It will of course be understood that the rod 21 and contact member 16 may be interconnected in any other suitable manner as by a pivoted joint, for example. A spring 25 arranged to have its tension adjusted by a screw 26 is provided for biasing the rod 21 and armature 17 to the position of the contact member 16 in which the maximum resistance is inserted in the field circuit of the machine 2.

The operation of my invention will be readily understood if it be assumed that the voltage of the circuit 1 has fallen below its normal value and the contacts 12 and 13 are closed as illustrated. When this occurs, the resistor 5 is short-circuited and the current of the coil 6 is increased to a value at which the armature 17 is pulled downwardly to its closed position, thereby tending to move the right hand end of the contact member 16 in a direction to decrease the field circuit resistance of the machine 2. This movement is opposed by the springs 19, 23 and 25 and dash pot 22 which afford a ready means of producing a slight retarding force by which the sensitivity of the regulator is determined. As the right hand end of the contact member moves down, this member is rocked or rolled along the resistor contacts, and the excitation and voltage of the machine 2 are increased. When the voltage becomes sufficiently high, the contacts 12 and 13 are disengaged, thereby reducing the current of the coil 6 and releasing the armature 17 and rod 21 which are moved upwardly by the spring 23 acting against any retarding action of the dash pot 22. As the dash pot rod moves upwardly, the contact member 16 is rolled along the resistor contacts by the spring 19, thereby tending to decrease the voltage of the circuit. If this decrease in voltage is sufficient to cause the contacts 12 and 13 to disengage, the field resistor of the machine 2 is again operated as previously described to raise the circuit voltage. There is thus produced in more or less rapid succession a series of operations by which the circuit voltage is maintained within narrow limits.

Fig. 2 shows a pulp grinding equipment which comprises a motor 27 arranged to be supplied with current through the line 36 for driving the grinding element 28 and which also comprises a direct current feed motor 29 operated through suitable means illustrated as a rack 30 and pinion 31 to feed the wood or logs 32 into engagement with the grinding element. The armature winding 33 of the feed motor 29 is adapted to be supplied with current through the leads 34 and the field winding 35 of this motor is arranged to be connected to the leads 34 through the adjustable resistor 15 of the regulating apparatus described in connection with Fig. 1. As utilized in the pulp grinding equipment, the operating coil 7 of the control relay is connected to be supplied from the current transformer 37 with current of a value proportional to the load of the motor 27, an adjustable resistor 38 being provided for shunting more or less of the transformer current past the winding 7 to predetermine the load maintained on the motor 27 by the regulating apparatus.

While the motor 27 is operating at a load somewhat below its maximum permissible value, the contacts 12 and 13 are in engagement, the resistor 5 is short-circuited and the contact member 16 tends to move into a position where the excitation of the motor 29 is reduced and its speed is increased. When this occurs, the rate at which the wood is advanced toward the grindstone is accelerated and the load on the motor 27 is increased. As the load of the motor 27 increases, the secondary current of the transformer 37 becomes larger and the current of the coil 7 is increased to a value at which the contacts 12 and 13 are disengaged. When this occurs, the resistor 5 is connected directly in series with the operating coil 6 of the regulating relay and the contact member 16 is moved into a position to increase the excitation of the feed motor and reduce its speed. The load of the motor 27 is thus maintained within limits determined by the sensitivity of the regulating apparatus and by the adjustment of the rheostat 38.

As will be evident to those skilled in the art, my invention permits of various modifications without departing from the true spirit thereof or from the scope of the appended claims.

What I claim as new and desire to secure by Letters Patent of the United States, is:

1. A regulating apparatus comprising a resistor having a plurality of contacts and a contact member adapted to engage said contacts, retarding means having a movable member arranged to cooperate with said contact member, electroresponsive means including an armature pivoted at one end and resiliently connected to said movable member at its other end, and means for biasing said contact member to a position in which it exerts upon said movable member a force tending to move said armature to its open position.

2. A regulating apparatus comprising a relay having an armature, retarding means including a movable member resiliently connected to said armature, and a resistor having a contact member arranged to support said movable member.

3. A regulating apparatus comprising a relay having an armature movable to open and closed positions, retarding means including a movable member resiliently connected with said armature, and a resistor including a plurality of contacts and a contact member arranged to support said movable member and to roll along said contacts in accordance with the movement of said movable member.

4. A regulating apparatus comprising a retarding means having a movable member, a relay including an armature pivoted at one end and resiliently connected to said movable member at the other end, a resistor including a plurality of contacts and a contact member arranged to be moved along said contacts in accordance with the movement of said movable member, and means arranged to bias said movable member to a position for maintaining said armature in its open position.

5. An electric circuit regulating apparatus comprising a resistor having a contact member, a dash pot including a plunger rod arranged to cooperate with said contact member, a relay including an armature pivoted at one end and resiliently connected to said rod at the other end, means for biasing said contact member to a position in which it tends to support said rod, means for biasing said rod to a position in which said armature is maintained in its open position, and means for controlling the actuation of said relay in accordance with an electrical condition of the circuit to be regulated.

In witness whereof, I have hereunto set my hand this 13th day of September, 1924.

FRED H. WINTER.